United States Patent

Yamaoka et al.

(10) Patent No.: US 9,671,782 B2
(45) Date of Patent: Jun. 6, 2017

(54) AUTONOMOUS DRIVING DEVICE

(71) Applicant: TOYOTA JIDOSHA KABUSHIKI KAISHA, Toyota-shi, Aichi (JP)

(72) Inventors: Masaaki Yamaoka, Susono (JP); Kohshi Katoh, Hadano (JP); Eishi Takeuchi, Nagoya (JP); Tomoyuki Kuriyama, Hadano (JP); Hikaru Sato, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/878,006

(22) Filed: Oct. 8, 2015

(65) Prior Publication Data
US 2016/0209841 A1 Jul. 21, 2016

(30) Foreign Application Priority Data
Jan. 19, 2015 (JP) .................. 2015-008123

(51) Int. Cl.
G05D 1/00 (2006.01)
B60W 30/00 (2006.01)

(52) U.S. Cl.
CPC ........... *G05D 1/0061* (2013.01); *B60W 30/00* (2013.01); *G05D 2201/0213* (2013.01)

(58) Field of Classification Search
None
See application file for complete search history.

(56) References Cited

U.S. PATENT DOCUMENTS

| 6,015,008 A | 1/2000 | Kogure et al. |
| 6,185,499 B1* | 2/2001 | Kinoshita .......... B60K 31/0008 180/179 |
| 7,970,506 B2* | 6/2011 | DeMarco ............... G05D 1/104 342/20 |
| 8,073,609 B2* | 12/2011 | Koch ............... G08G 1/096716 701/450 |
| 8,126,642 B2* | 2/2012 | Trepagnier ............ G01S 17/023 180/167 |
| 8,140,239 B2* | 3/2012 | Stratton .................. B60T 8/175 340/989 |

(Continued)

FOREIGN PATENT DOCUMENTS

| JP | 11-31769 A | 2/1999 |
| JP | 201131769 A | 2/2011 |

*Primary Examiner* — Jonathan M Dager
(74) *Attorney, Agent, or Firm* — Sughrue Mion, PLLC

(57) ABSTRACT

There is provided an autonomous driving device that improves the convenience for a driver in the switching between autonomous driving and manual driving. When the driver discovers an obstacle which cannot be detected by an autonomous driving device, and performs a driving operation which causes a manual driving switching threshold value to be exceeded for an operation time less than or equal to an operation threshold value so as to avoid the obstacle, a control unit of the autonomous driving device switches autonomous driving to manual driving, and then the control unit switches manual driving to autonomous driving even if the driver does not perform an autonomous driving switching operation. For this reason, it is possible to improve the convenience for the driver in the switching between autonomous driving and manual driving.

4 Claims, 6 Drawing Sheets

(56) References Cited

U.S. PATENT DOCUMENTS

| | | | | |
|---|---|---|---|---|
| 8,244,455 B2* | 8/2012 | Case | | G01C 21/005 701/123 |
| 8,595,037 B1* | 11/2013 | Hyde | | G06Q 40/08 701/2 |
| 8,670,891 B1 | 3/2014 | Szybalski et al. | | |
| 9,000,903 B2* | 4/2015 | Bowers | | B60Q 1/00 340/435 |
| 9,097,520 B2* | 8/2015 | Stratton | | G01C 7/04 |
| 9,110,471 B2* | 8/2015 | Pack | | G05D 1/0061 |
| 9,163,384 B2* | 10/2015 | Stratton | | E02F 3/84 |
| 9,163,909 B2* | 10/2015 | Chengalva | | F41H 7/005 |
| 9,165,469 B2* | 10/2015 | Bowers | | G08G 1/161 |
| 9,235,218 B2* | 1/2016 | Levien | | G05D 1/12 |
| 2003/0234127 A1* | 12/2003 | Sudou | | B60K 31/0008 180/170 |
| 2006/0089763 A1* | 4/2006 | Barrett | | G05D 1/0061 701/23 |
| 2006/0089764 A1* | 4/2006 | Filippov | | G05D 1/027 701/23 |
| 2006/0089765 A1* | 4/2006 | Pack | | G05D 1/0061 701/23 |
| 2006/0089766 A1* | 4/2006 | Allard | | G05D 1/0061 701/23 |
| 2006/0089800 A1* | 4/2006 | Svendsen | | G05D 1/027 701/301 |
| 2008/0306668 A1* | 12/2008 | Wang | | B60K 31/00 701/93 |
| 2009/0010494 A1* | 1/2009 | Bechtel | | B60Q 1/1423 382/104 |
| 2010/0168998 A1* | 7/2010 | Matsunaga | | B60W 30/10 701/532 |
| 2010/0305778 A1* | 12/2010 | Dorneich | | G05D 1/0044 701/2 |
| 2012/0035788 A1* | 2/2012 | Trepagnier | | B60W 30/00 701/3 |
| 2012/0123643 A1 | 5/2012 | Limpibuntering et al. | | |
| 2012/0259516 A1* | 10/2012 | Grolle | | B60W 10/06 701/48 |
| 2014/0025259 A1* | 1/2014 | Szwabowski | | B60W 50/00 701/36 |
| 2014/0156133 A1* | 6/2014 | Cullinane | | B60W 30/00 701/23 |
| 2014/0244096 A1* | 8/2014 | An | | G05D 1/0055 701/25 |
| 2015/0073658 A1* | 3/2015 | Stoof | | B60G 17/06 701/37 |

* cited by examiner

AUTONOMOUS DRIVING DEVICE

TECHNICAL FIELD

An aspect of the present invention relates to an autonomous driving device.

BACKGROUND

U.S. Pat. No. 8,670,891 discloses an autonomous driving device that can switch a drive mode between manual driving by a driver and autonomous driving by an in-vehicle computer.

When a touch sensor of a steering wheel detects that the driver operates the steering wheel during autonomous driving, the autonomous driving device switches a drive mode from autonomous driving to manual driving. When the touch sensor of the steering wheel detects that the driver keeps their hands off the steering wheel during manual driving, the autonomous driving device switches a drive mode from manual driving to autonomous driving.

SUMMARY

For example, when the driver discovers an obstacle non-detectable by the autonomous driving device, and operates the steering wheel, the autonomous driving device disclosed in U.S. Pat. No. 8,670,891 switches a drive mode from autonomous driving to manual driving. Typically, it is considered that a driver's desire is to return to autonomous driving once the obstacle or the like is avoided. However, according to the autonomous driving device disclosed in U.S. Pat. No. 8,670,891, unless the driver performs an autonomous driving switching operation, for example, unless the driver keeps their hands off the steering wheel, manual driving continues without being switched to autonomous driving. For this reason, it is desirable to improve the convenience for the driver.

An object of the present invention is to provide an autonomous driving device that improves the convenience for a driver in regard to the switching between autonomous driving and manual driving.

According to an aspect of the present invention, there is provided an autonomous driving device including a control unit configured to control switching between manual driving and autonomous driving of a vehicle, and a detection unit configured to detect a driving operation by a driver of the vehicle, in which when the driving operation value of the driving operation is less than or equal to a manual driving switching threshold value during autonomous driving, the control unit continues to perform autonomous driving, when the driving operation value of the driving operation exceeds the manual driving switching threshold value during autonomous driving, the control unit switches autonomous driving to manual driving, and when autonomous driving is switched to manual driving due to the driving operation value exceeding the manual driving switching threshold value, and a driving operation time from when the driving operation value exceeds a timing start threshold value to when the driving operation value is less than or equal to an autonomous driving switching threshold value is less than or equal to an operation time threshold value, the control unit switches manual driving to autonomous driving.

In this configuration, for example, when the driver discovers an obstacle which cannot be detected by the autonomous driving device, and performs a driving operation which causes a manual driving switching threshold value to be exceeded for an operation time less than or equal an operation time threshold value so as to avoid the obstacle, the control unit switches autonomous driving to manual driving, and then the control unit switches manual driving to autonomous driving even if the driver does not perform an autonomous driving switching operation. For this reason, it is possible to improve the convenience for the driver in the switching between autonomous driving and manual driving.

In this case, the autonomous driving switching threshold value may be set to a value which is less than the manual driving switching threshold value.

In this configuration, it is possible to prevent frequent switching between autonomous driving and manual driving compared to when the autonomous driving switching threshold value is set to a value which is greater than or equal to the manual driving switching threshold value.

According to the aspect of the present invention, it is possible to improve the convenience for the driver in the switching between autonomous driving and manual driving.

DETAILED DESCRIPTION

Figure 1:
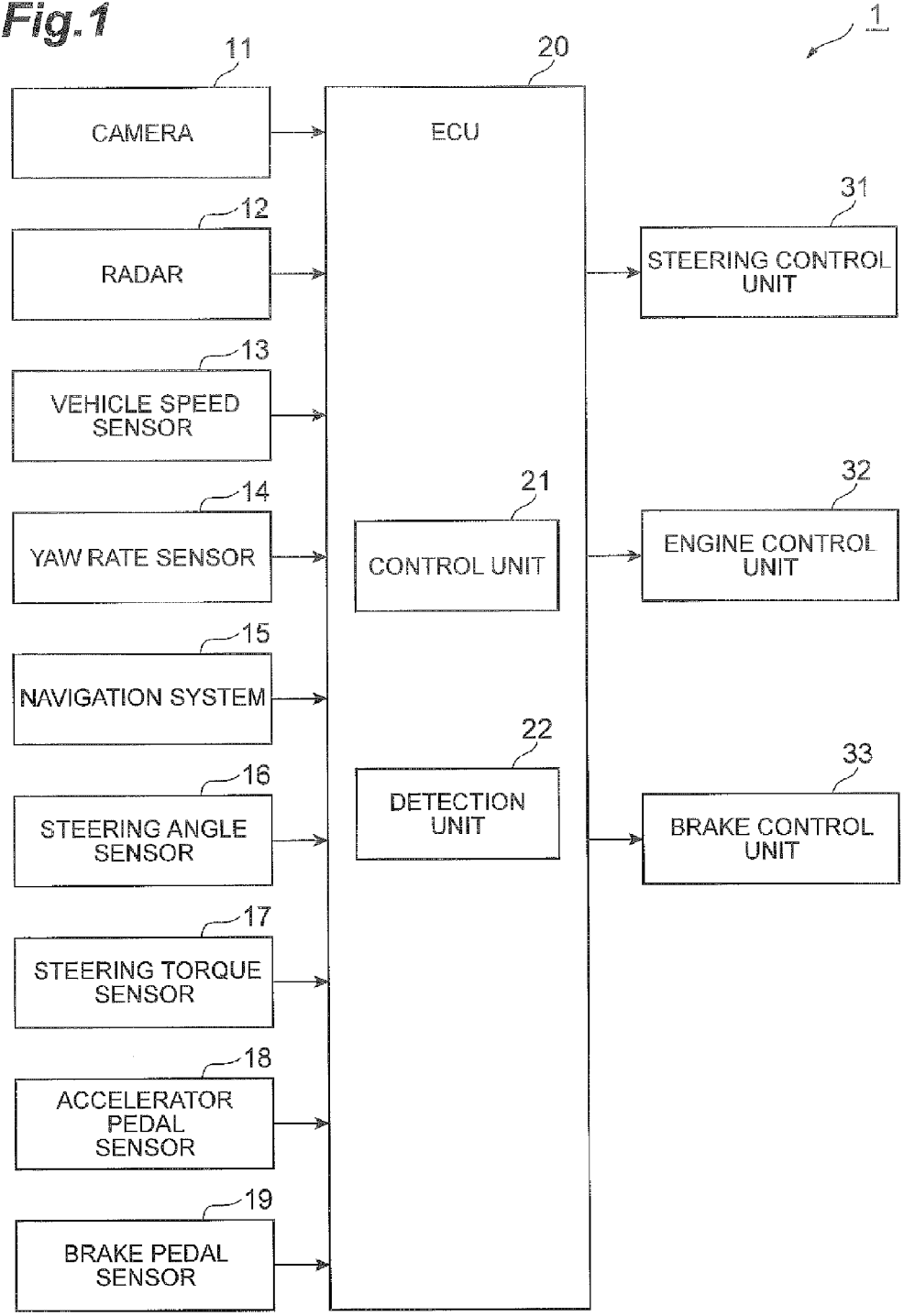
FIG. 1 is a block diagram illustrating an autonomous driving device of an embodiment.

Hereinafter, an autonomous driving device in an embodiment of the present invention will be described with reference to the accompanying drawings. For example, an autonomous driving device 1 in FIG. 1 is mounted in a vehicle such as a passenger car, and controls traveling of the vehicle. The autonomous driving device 1 switches the drive mode of the vehicle between autonomous driving and manual driving. Autonomous driving refers to a drive mode in which a driver does not objectively drive the vehicle, and the vehicle autonomously travels along a road on which vehicles are traveling. Autonomous driving includes a drive mode in which the driver does not objectively drive the vehicle, and the vehicle autonomously travels to a pre-set destination.

For example, autonomous driving includes lane keeping assist control. The lane keeping assist control is performed to autonomously steer the vehicle in such a way that the vehicle does not depart from a traveling lane. For example, even if the driver does not operate a steering wheel, the lane keeping assist control causes the vehicle to be autonomously steered along the traveling lane. Autonomous driving includes cruise control. For example, the cruise control is constant speed control that causes the vehicle to travel at a constant pre-set speed when no preceding vehicle is present in front of the vehicle. In addition, the cruise control is following control that adjusts the speed of the vehicle according to the vehicle-to-vehicle distance between the vehicle and a preceding vehicle when a preceding vehicle is present in front of the vehicle.

Manual driving is a drive mode in which the driver objectively drives the vehicle. Manual driving includes a drive mode in which the vehicle travels with only a driving operation by the driver. Manual driving also includes a drive mode in which the driver objectively drives the vehicle, and drive assist control is performed to assist the driver in driving the car. For example, the drive assist control performed during manual driving includes a mode in which the driver objectively performs any one of a steering operation, an acceleration operation, and a brake operation of the vehicle, and the autonomous driving device 1 performs any one of steering control, engine control, and brake control which is performed in the subjective driving operation by the driver.

As illustrated in FIG. 1, the autonomous driving device 1 includes a camera 11; a radar 12; a vehicle speed sensor 13; a yaw rate sensor 14; a navigation system 15; a steering angle sensor 16; a steering torque sensor 17; an accelerator pedal sensor 18; a brake pedal sensor 19; an ECU 20; a steering control unit 31; an engine control unit 32; and a brake control unit 33.

The camera 11 is an imaging device that images in the front of the vehicle. A CCD camera, a CMOS camera, or the like can be used as the camera 11. In order to recognize two lane dividing lines that partition off a lane on which vehicles are traveling, the camera 11 images a road on which the host vehicle is traveling, and thus the camera 11 acquires captured images in a direction in which the vehicle is advancing. An output from the camera 11 is input to the ECU 20, and the images captured by the camera 11 are acquired by the ECU 20.

For example, the radar 12 is provided at front end of the vehicle body of the vehicle, and using millimeter waves, the radar 12 detects the position and the relative speed of an obstacle such as a preceding vehicle in front of the vehicle. The radar 12 is also used to recognize the shape of a road on which vehicles are traveling. For example, the radar 12 detects an obstacle by transmitting millimeter waves in the front of the host vehicle, and receiving the millimeter waves reflected by the obstacle such as preceding vehicle. The radar 12 transmits information regarding the detected obstacle to the ECU 20. A laser imaging detection and ranging (LIDAR) or the like may be used instead of the radar 12.

The vehicle speed sensor 13 is configured to measure the speed of the vehicle in the direction of advance by detecting the rotation speed of a wheel of the vehicle as a pulse signal. An output from the vehicle speed sensor 13 is input to the ECU 20, and the pulse signal detected by the vehicle speed sensor 13 is acquired by the ECU 20.

The yaw rate sensor 14 is configured to detect a yaw rate (rotational angular speed) around a vertical axis through the center of gravity of the vehicle. A gyro sensor or the like can be used as the yaw rate sensor 14. The yaw rate sensor 14 outputs a signal according to the detected yaw rate of the vehicle to the ECU 20.

The navigation system 15 is used to acquire the shape of a road on which vehicles are traveling. The navigation system 15 is configured to include a global positioning system (GPS); an acceleration sensor; a gyro sensor; and a database in which map information is stored. The navigation system 15 determines the position of the vehicle based on information acquired from the GPS, the acceleration sensor, the gyro sensor, and the vehicle speed sensor 13. The navigation system 15 acquires information regarding the curvature of a lane on which the vehicle is traveling, based on the map information and the position of the vehicle.

The steering angle sensor 16 is configured to detect the steering angle of the vehicle. For example, the steering angle sensor 16 is attached to a steering shaft, and outputs a signal according to a rightward or leftward steering direction, a neutral position, and a steering angle to the ECU 20. The steering angle sensor 16 is configured to include a light emitting diode; a phototransistor; a slit plate attached to the steering shaft; and the like. The light emitting diode and the phototransistor face each other with the slit plate interposed therebetween. The slit plate rotating together with the steering shaft transmits and blocks light from the light emitting diode, and the phototransistor is turned on and off such that a signal according to a steering angle is output. The steering angle sensor 16 may be built into the steering control unit 31.

For example, the steering torque sensor 17 is provided on the steering shaft of the vehicle, and detects a steering torque that the driver of the vehicle applies to the steering wheel. The steering torque sensor 17 transmits information regarding the detected steering torque to the ECU 20.

For example, the accelerator pedal sensor 18 is provided on a shaft portion of the accelerator pedal of the vehicle, and detects the amount of depression of the accelerator pedal (the position of the accelerator pedal). The accelerator pedal sensor 18 may detect an operation force applied to the accelerator pedal (depressing force applied to the accelerator pedal or the like). The accelerator pedal sensor 18 outputs a signal according to the detected amount of depression of the accelerator pedal and the detected operation force applied to the accelerator pedal to the ECU 20.

For example, the brake pedal sensor 19 is provided on a portion of the brake pedal, and detects the amount of depression of the brake pedal (the position of the brake pedal). The brake pedal sensor 19 may detect an operation force applied to the brake pedal (depressing force applied to the brake pedal, the pressure of the master cylinder, or the like). The brake pedal sensor 19 outputs a signal according to the detected amount of depression of the brake pedal or the detected operation force applied to the brake pedal to the ECU 20.

The electronic control unit (ECU) 20 is a computer that controls the autonomous driving device 1. The ECU 20 includes a central processing unit (CPU); memories such as a read only memory (ROM) and a random access memory (RAM); an input and output interface; and the like. The ECU 20 includes a control unit 21 and a detection unit 22. The hardware of the ECU 20 operates according to a predetermined program such that the hardware of the ECU 20 serves as the control unit 21 and the detection unit 22. The ECU 20 may be made up of a plurality of ECUs.

The control unit 21 controls switching between manual driving and autonomous driving of the vehicle, which will be described later. During autonomous driving, the control unit 21 performs autonomous driving control such as the lane keeping assist control and the cruise control based on information obtained from the camera 11, the radar 12, the vehicle speed sensor 13, the yaw rate sensor 14, the navigation system 15, and the steering angle sensor 16.

The detection unit 22 detects a driving operation by the driver of the vehicle. The detection unit 22 detects a driving operation by the driver as a driving operation value. In the embodiment, the driving operation by the driver refers to the operation of the steering wheel, the accelerator pedal, the brake pedal or the like by the driver. The driving operation by the driver includes the operation of the shift lever of the transmission.

The driving operation value refers to the steering angle of the vehicle detected by the steering angle sensor 16; the amount of change (steering speed) in the steering angle per unit time calculated based on the detection value of the steering angle sensor 16; the steering torque detected by the steering torque sensor 17; the rotational speed of the steering wheel; the amount of depression of the accelerator pedal detected by the accelerator pedal sensor 18; the amount of change (the depression speed of the accelerator pedal) in the amount of depression of the accelerator pedal per unit time calculated based on the detection value of the accelerator pedal sensor 18; the operation force applied to the accelerator pedal; the amount of depression of the brake pedal detected by the brake pedal sensor 19; the amount of change (the depression speed of the brake pedal) in the amount of depression of the brake pedal per unit time calculated based on the detection value of the brake pedal sensor 19; the operation force applied to the brake pedal; or the like.

For example, the steering control unit 31 is an electronic control unit that controls an electric power steering (EPS) system of the vehicle. The steering control unit 31 controls the steering angle of the vehicle by driving an assist motor in the electric power steering system which controls a steering torque of the vehicle. The steering control unit 31 controls the steering angle according to a control signal from the control unit 21 of the ECU 20.

The engine control unit 32 is an electronic control unit that controls the engine of the vehicle. For example, the engine control unit 32 controls a drive force of the vehicle by controlling the amounts of supply of fuel and air to the engine. When the vehicle is a hybrid vehicle or an electric vehicle, the engine control unit 32 serves as a motor control unit that controls a motor driven as a power source. The engine control unit 32 controls the drive force of the vehicle according to a control signal from the ECU 20.

The brake control unit 33 is an electronic control unit that controls the brake system of the vehicle. A hydraulic brake system or the like can be used as the brake system. The brake control unit 33 controls a braking force applied to the wheels of the vehicle by adjusting a hydraulic pressure applied to the hydraulic brake system. The brake control unit 33 controls the braking force to the wheels according to a control signal from the ECU 20. When the vehicle includes a regenerative brake system, the brake control unit 33 may control the hydraulic brake system and the regenerative brake system.

Figure 2:
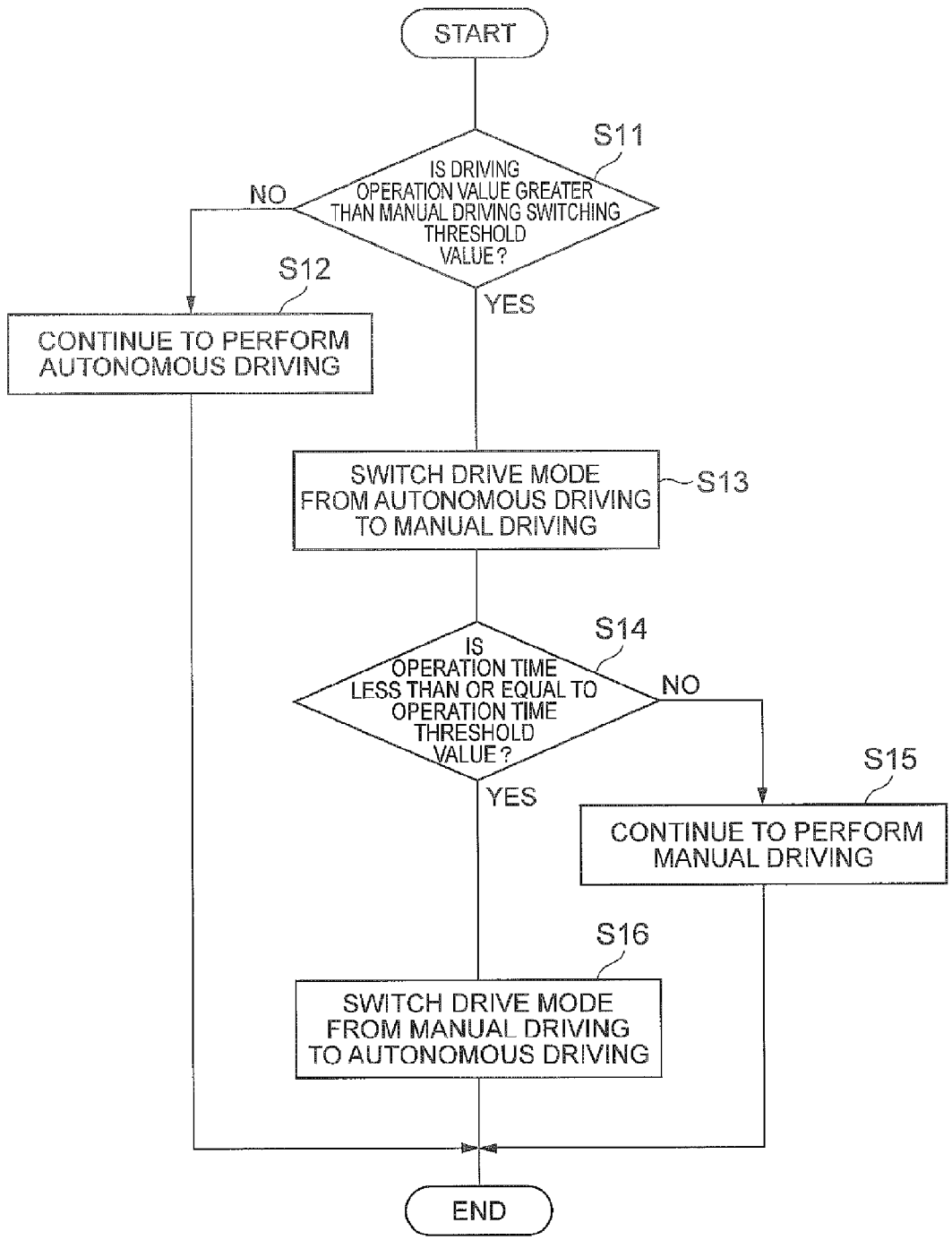
FIG. 2 is a flowchart illustrating the operation of the autonomous driving device in FIG. 1.

Hereinafter, the operation of the autonomous driving device 1 in the embodiment will be described. In a situation to be described hereinafter, the autonomous driving device 1 is assumed to perform autonomous driving including the lane keeping assist control and the cruise control. During autonomous driving, the detection unit 22 of the autonomous driving device 1 detects a driving operation by the driver of the vehicle. As illustrated in FIG. 2, the control unit 21 of the autonomous driving device 1 determines whether the driving operation value of a driving operation by the driver of the vehicle exceeds a manual driving switching threshold value (S11).

The manual driving switching threshold value is a driving operation threshold value that is set to switch a drive mode from autonomous driving to manual driving according to the magnitude of the driving operation value. The manual driving switching threshold value is set for the steering angle, the steering speed, and the steering torque of the vehicle, the rotational speed of the steering wheel, the amount of depression of the accelerator pedal, the depression speed of the accelerator pedal, the operation force applied to the accelerator pedal, the amount of depression of the brake pedal, the depression speed of the brake pedal, and the operation force applied to the brake pedal, all of which are driving operation values. The manual driving switching threshold value may be a fixed value, or may be changed depending on the traveling status of the vehicle. For example, the manual driving switching threshold value can be set to a value of 0.5 N·m to 1.0 N·m for the steering torque which is a driving operation value. Alternatively, the manual driving switching threshold value can be set to zero depending on the traveling status of the vehicle.

Figure 3:
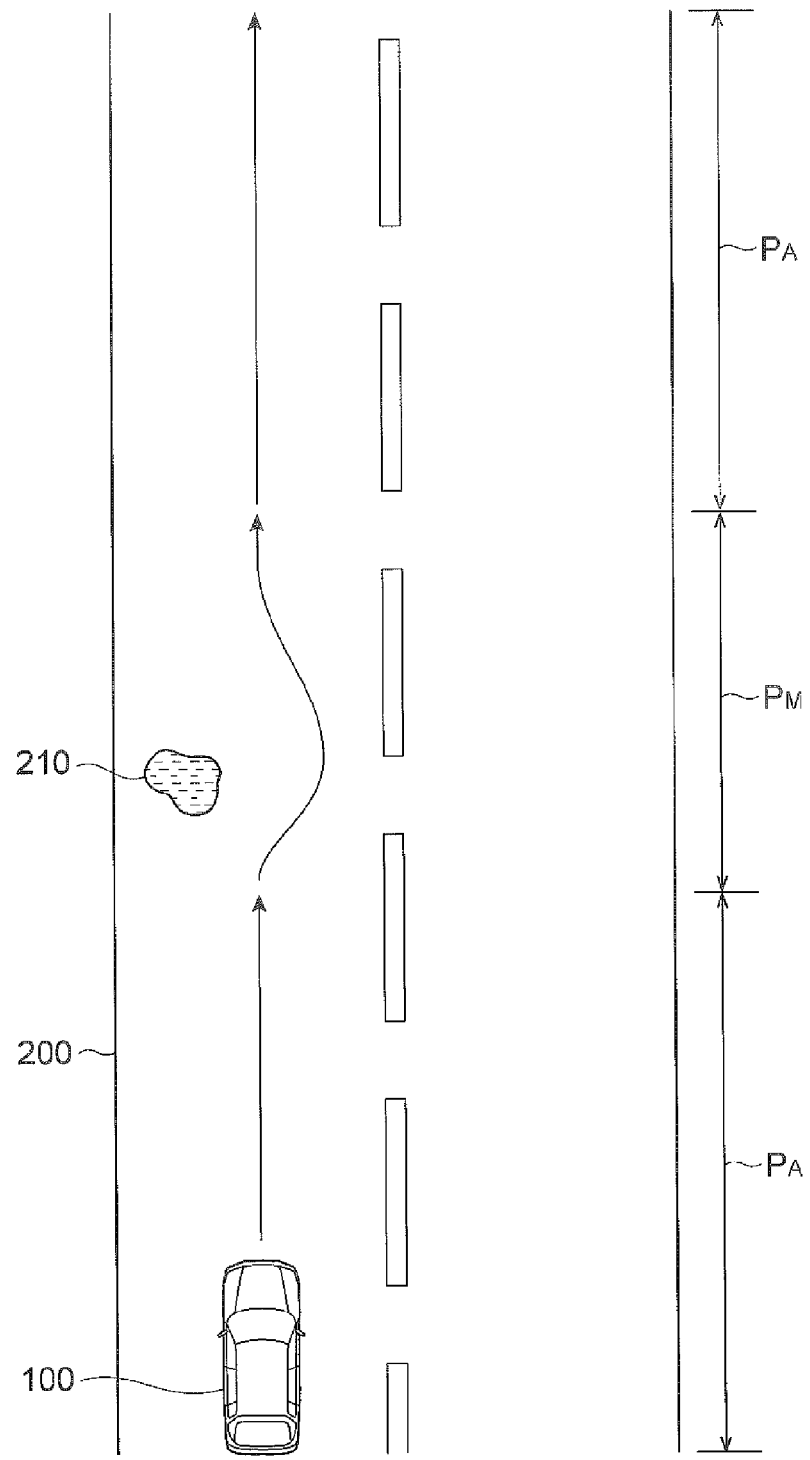
FIG. 3 is a plan view illustrating a situation in which the autonomous driving device in FIG. 1 operates.
Figure 4:
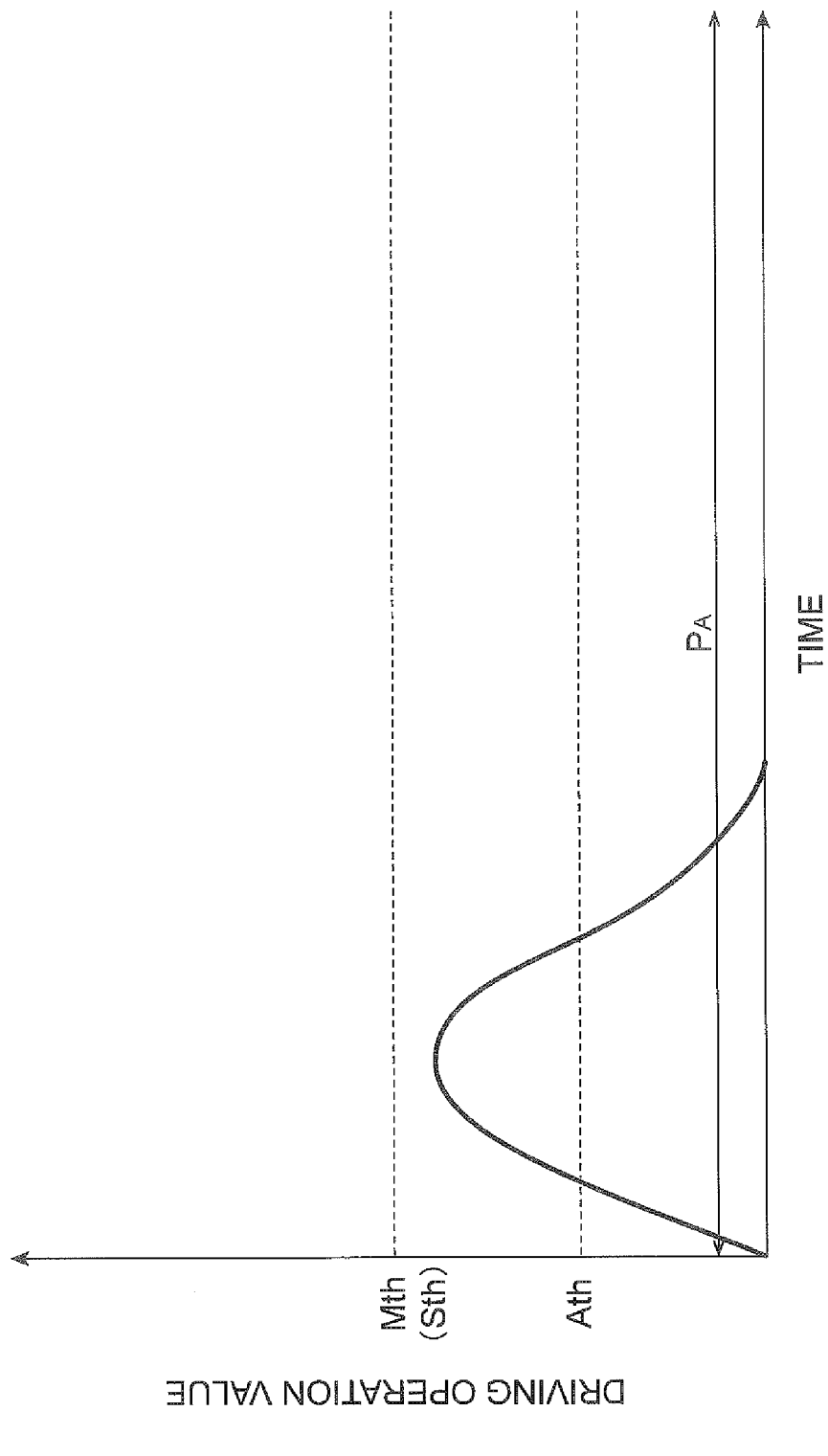
FIG. 4 is a graph illustrating a change in a driving operation value when autonomous driving continues.

For example, as illustrated in FIG. 3, a vehicle 100 is assumed to autonomously travel on a road 200. In FIG. 3, during autonomous driving, the driver does not drive the vehicle 100 in the traveling section according to an autonomous driving period $P_A$ before the vehicle reaches the vicinity of an obstacle 210. As illustrated in FIG. 4, even if the driver touches the steering wheel, the accelerator pedal, or the brake pedal, since the driver has no intention of controlling the behavior of the vehicle 100 during autonomous driving, the driving operation value is less than or equal to a manual driving switching threshold value $M_{th}$. As such, when the driving operation value is less than or equal to the manual driving switching threshold value $M_{th}$ (S11), the control unit 21 continues to perform autonomous driving (S12).

Figure 5:
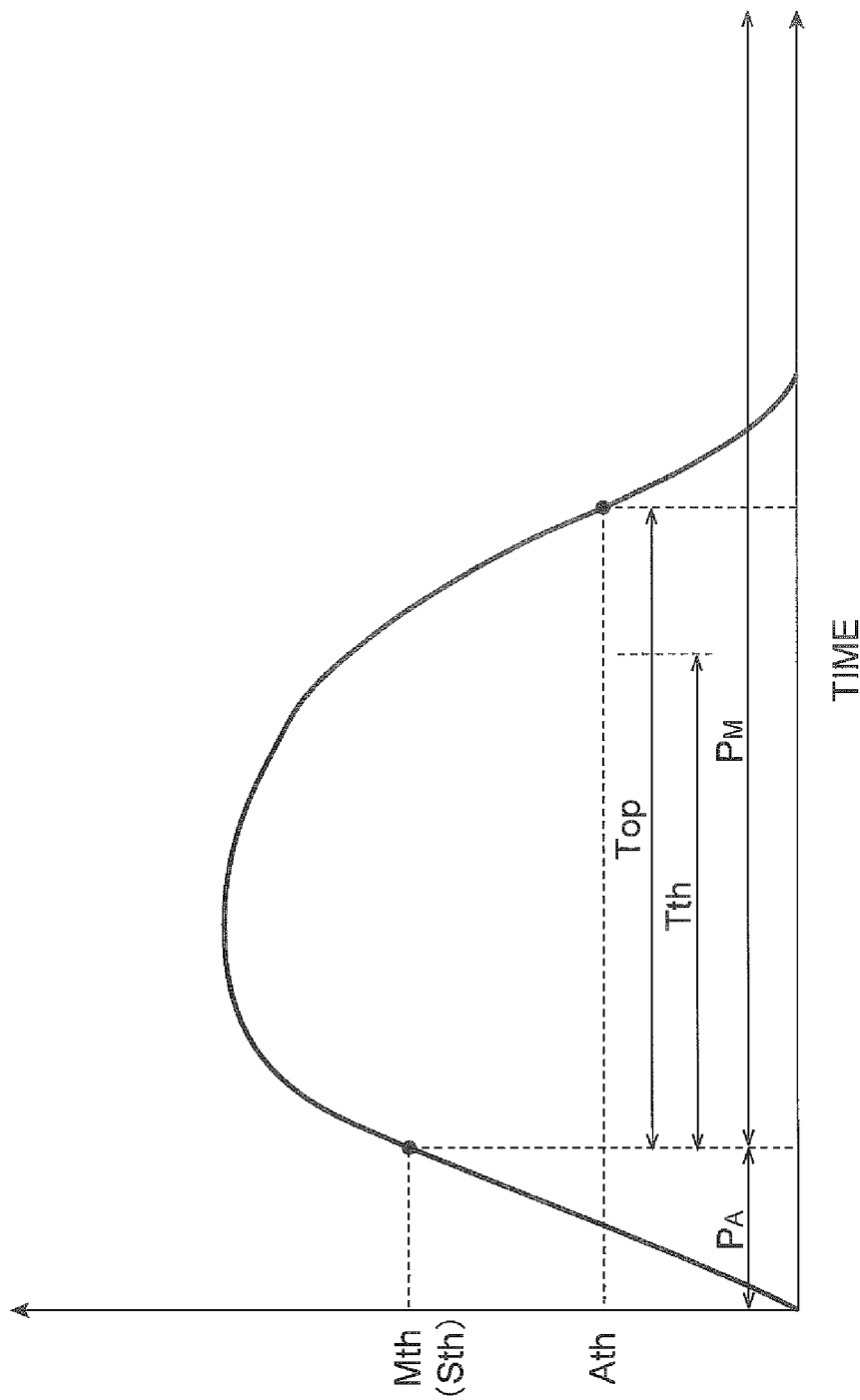
FIG. 5 is a graph illustrating a change in the driving operation value when autonomous driving is switched to manual driving due to the driving operation value exceeding a manual driving switching threshold value.
Figure 6:
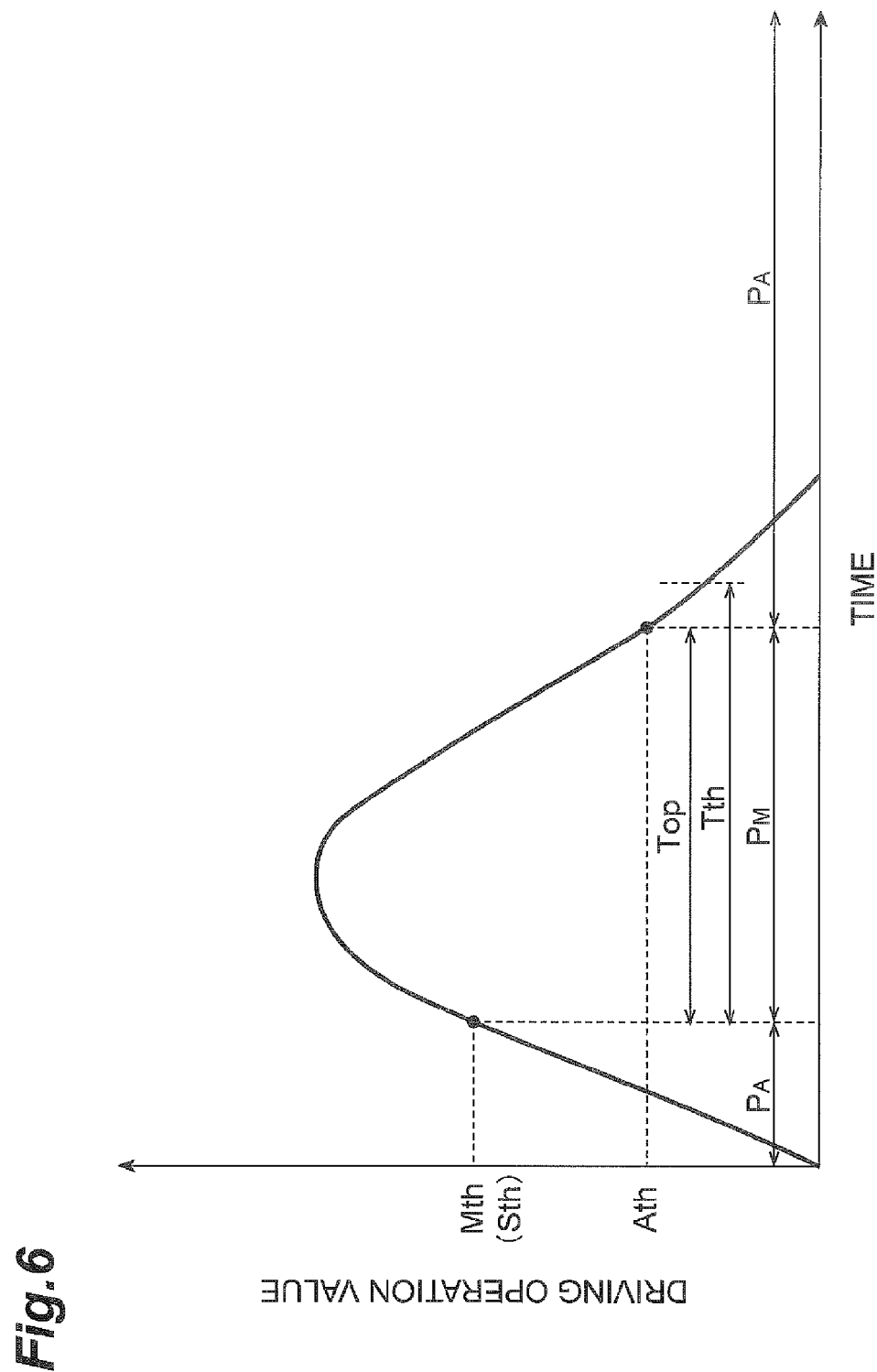
FIG. 6 is a graph illustrating a change in the driving operation value when autonomous driving is switched to manual driving due to the driving operation value exceeding the manual driving switching threshold value, but manual driving is switched back to autonomous driving because an operation time is less than or equal to an operation time threshold value.

Next, the vehicle 100 is assumed to reach the vicinity of the obstacle 210. The obstacle 210 is an obstacle such as a puddle of water accumulated on the road 200 or a small animal suddenly rushing into the road 200, which cannot be easily detected by the autonomous driving device 1. In this case, as illustrated in FIG. 5 or 6, during autonomous driving, the driver performs a driving operation so as to avoid the obstacle 210. When the driving operation value exceeds the manual driving switching threshold value $M_{th}$ (S11), the control unit 21 switches a drive mode from autonomous driving to manual driving (S13). In the traveling section corresponding to a manual driving period $P_M$ illustrated in FIGS. 3, 5, and 6, the driver manually drives the vehicle.

When autonomous driving is switched to manual driving due to the driving operation value exceeding the manual driving switching threshold value $M_{th}$, the control unit 21 determines whether a driving operation time from when the driving operation value exceeds a timing start threshold value to when the driving operation value is less than or equal to an autonomous driving switching threshold value is less than or equal to an operation time threshold value (S14). As illustrated in FIGS. 5 and 6, an operation time $T_{OP}$ is a time from when the driving operation value is greater than or equal to a timing start threshold value $S_{th}$ to when the driving operation value is less than or equal to an autonomous driving switching threshold value $A_{th}$.

The timing start threshold value $S_{th}$ is a driving operation threshold value that is set to determine the start point of the operation time $T_{OP}$ according to the magnitude of the driving operation value. Similar to the manual driving switching threshold value $M_{th}$, the timing start threshold value $S_{th}$ is set for the steering angle, the steering torque, and the like of the vehicle which are driving operation values. The timing start threshold value $S_{th}$ may be a fixed value, or may be changed depending on the traveling status of the vehicle 100. As illustrated in FIGS. 5 and 6, in the embodiment, the timing start threshold value $S_{th}$ is set to the same value as the manual driving switching threshold value $M_{th}$; however, the timing start threshold value $S_{th}$ may be set to a value which is greater than or less than the manual driving switching threshold value $M_{th}$. Alternatively, the timing start threshold value $S_{th}$ can be set to zero depending on the traveling status of the vehicle 100.

The autonomous driving switching threshold value $A_{th}$ is a driving operation threshold value that is set to switch a drive mode from manual driving to autonomous driving according to the magnitude of the driving operation value when autonomous driving is switched to manual driving due to the driving operation value exceeding the manual driving switching threshold value $M_{th}$. The autonomous driving switching threshold value $A_{th}$ is a driving operation threshold value that is set to determine the end point of the operation time $T_{OP}$ according to the magnitude of the driving operation value. Similar to the manual driving switching threshold value $M_{th}$, the autonomous driving switching threshold value $A_{th}$ is set for the steering angle, the steering torque, and the like of the vehicle which are driving operation values. The autonomous driving switching threshold value $A_{th}$ may be a fixed value or may be changed depending on the traveling status of the vehicle 100.

As illustrated in FIGS. 5 and 6, in the embodiment, in order to prevent excessively frequent switching between autonomous driving and manual driving, the autonomous driving switching threshold value $A_{th}$ is set to a value which is less than the manual driving switching threshold value $M_{th}$. However, depending on the traveling status of the vehicle 100, the autonomous driving switching threshold value $A_{th}$ may be set to the same value as the manual driving switching threshold value $M_{th}$, or set to a value which is greater than the manual driving switching threshold value $M_{th}$. Alternatively, the autonomous driving switching threshold value $A_{th}$ can be set to zero depending on the traveling status of the vehicle 100.

An operation time threshold value $T_{th}$ in FIGS. 5 and 6 is a threshold value for the operation time $T_{OP}$ which is set to switch a drive mode from manual driving to autonomous driving according to the length of the operation time $T_{OP}$ when autonomous driving is switched to manual driving due to the driving operation value exceeding the manual driving switching threshold value $M_{th}$. The operation time threshold value $T_{th}$ may be a fixed value, or may be changed depending on the traveling status of the vehicle 100. The operation time threshold value $T_{th}$ can be set to a time of approximately 0.5 seconds to 2.0 seconds or a time of approximately 0.8 seconds to 1.5 seconds.

As illustrated in FIG. 5, when the operation time $T_{OP}$ exceeds the operation time threshold value $T_{th}$, the driver is considered to have the intention of continuing to manually drive the vehicle even after avoiding the obstacle 210. For this reason, when the operation time $T_{OP}$ exceeds the operation time threshold value $T_{th}$ (S14), the control unit 21 continues to perform manual driving (S15).

In contrast, as illustrated in FIG. 6, when the operation time $T_{OP}$ is less than or equal to the operation time threshold value $T_{th}$, the driver is considered to desire to return to autonomous driving after avoiding the obstacle 210. For this reason, when the operation time $T_{OP}$ is less than or equal to the operation time threshold value $T_{th}$ (S14), the control unit 21 switches a drive mode from manual driving to autonomous driving (S16). In the traveling section corresponding to the autonomous driving period $P_A$ after the manual driving period $P_M$ illustrated in FIGS. 3 and 6, the control unit 21 performs autonomous driving including the lane keeping assist control and the cruise control.

In the embodiment, for example, when the driver discovers the obstacle 210 which cannot be detected by the autonomous driving device 1, and performs a driving operation which causes the manual driving switching threshold value $M_{th}$ to be exceeded for an operation time less than or equal to the operation time threshold value $T_{th}$ so as to avoid the obstacle 210, the control unit 21 switches a drive mode from autonomous driving to manual driving, and then the control unit 21 switches the drive mode from autonomous driving to manual driving even if the driver does not perform an autonomous driving switching operation. For this reason, it is possible to improve the convenience for the driver in the switching of a drive mode between autonomous driving and manual driving.

In the embodiment, the autonomous driving switching threshold value $A_{th}$ is set to a value which is less than the manual driving switching threshold value $M_{th}$, and thus it is possible to prevent frequent switching between autonomous driving and manual driving compared to when the autonomous driving switching threshold value $A_{th}$ is set to a value which is greater than or equal to the manual driving switching threshold value $M_{th}$.

The autonomous driving device of the present invention is not limited to the aforementioned embodiment, and various modifications can be made to the embodiment insofar as the modifications do not depart from the purport of the present invention.

What is claimed is:

1. An autonomous driving device comprising:
    a control unit configured to control switching between manual driving and autonomous driving of a vehicle; and
    a detection unit configured to detect a driving operation by a driver of the vehicle,
    wherein when a driving operation value of the driving operation is less than or equal to a manual driving switching threshold value during autonomous driving, the control unit continues to perform autonomous driving,
    wherein when the driving operation value of the driving operation exceeds the manual driving switching threshold value during autonomous driving, the control unit switches autonomous driving to manual driving, and
    wherein when autonomous driving is switched to manual driving due to the driving operation value exceeding the manual driving switching threshold value, and a driving operation time from when the driving operation value exceeds a timing start threshold value to when the driving operation value is less than or equal to an autonomous driving switching threshold value is less than or equal to an operation time threshold value, the control unit switches manual driving to autonomous driving, and
    wherein the operation time threshold value is changed depending on a traveling status of the vehicle and the timing start threshold value is changed depending on the traveling status of the vehicle.

2. The autonomous driving device according to claim 1, wherein the autonomous driving switching threshold value is set to a value which is less than the manual driving switching threshold value.

3. The autonomous driving device according to claim 1, wherein the manual driving switching threshold value is changed depending on the traveling status of the vehicle.

4. The autonomous driving device according to claim 1, wherein the autonomous driving switching threshold value is changed depending on the traveling status of the vehicle.

\* \* \* \* \*